2,825,732

Patented Mar. 4, 1958

2,825,732

MANUFACTURE OF ETHYLENE UREA AND THE DIMETHYLOL DERIVATIVE THEREOF

Rosser Lee Wayland, Jr., Danville, Va., assignor to Dan River Mills, Incorporated, Danville, Va., a corporation of Virginia No Drawing. Application April 24, 1957
Serial No. 654,645

17 Claims. (Cl. 260—309.7)

This invention relates to a process for manufacturing ethylene urea and the dimethylol derivative thereof. In United States Patent 2,436,311 there is disclosed a high pressure process of reacting ethylene diamine and urea to form ethylene urea. In United States Patent 2,517,750 there is disclosed a process of reacting urea and an excess of ethylene diamine to form ethylene urea. In part, the present invention is an improvement on those processes.

This application is a continuation-in-part of allowed patent application Serial No. 458,703, filed September 27, 1954, by Rosser Lee Wayland, Jr., now abandoned.

It has now been found that a very satisfactory yield of ethylene urea can be obtained at atmospheric pressure by reacting substantially equimolar quantities of ethylene diamine and urea in the presence of a relatively high boiling point inert fluidizing liquid. In one form of the invention the fluidizing liquid is an inert solvent in which both ethylene diamine and urea are soluble. In this form of the invention it has been found that a water miscible solvent such as a glycol or glycerol is particularly useful in the manufacture of ethylene urea and the subsequent formation of dimethylol ethylene urea for the treatment of textiles in an aqueous solution.

In the other form of the invention the fluidizing liquid is a water immiscible material such as silicones, paraffin wax, mineral oil and other hydrocarbons having a suitably high boiling point. These fluidizing liquids cannot be termed solvents because a solution of urea in ethylene diamine will not necessarily dissolve in them but sometimes will form separate layers in the absence of stirring or other suitable agitation.

The term "relatively high boiling point" has a different significance in the two forms of the invention. In the case of a water miscible solvent as a fluidizing liquid, any boiling point of 188° C. or above has been proven satisfactory. In those instances, the boiling point of the solvent must be such that the boiling point of the reaction mixture in the final stages of reaction will be about 210° C. or above and preferably about 230° C., as temperatures in this range are necessary for completion of the reaction. Final conversion temperatures vary and a range of from 200° C. to 270° C. has been observed. In those instances where the invention is carried out with a solvent which is immiscible with the reactants, a somewhat higher boiling point is required. In those instances there is little increase in boiling point of the reaction mixture over and above the boiling point of the fluidizing liquid because there is no true solution and accordingly, the temperature required for completion of the reaction must be obtained without greatly surpassing the boiling point of the fluidizing liquid.

It has also been found that a somewhat higher temperature is required for completion of the reaction when water immiscible fluidizing liquids are used. With paraffin wax, for example, ethlyene urea can be formed at temperatures at or above about 245° C.

The process of the present invention is characterized by several advantages, as follows:

(1) No high pressure equipment is required, the entire process being operable at atmospheric pressure.

(2) No solvent recovery system is needed as it is not necessary to boil off and recover either fluidizing liquids or excess reactants.

(3) The reaction mixture is kept in a fluid state throughout all stages of processing. At the time the reaction temperature is in the range of about 130°–180° C., an insoluble product is formed, but the fluidizing liquids of this invention keep the insoluble constituents in such a state of dispersion that the fluidity of the mass is not impaired.

(4) No special procedure is necessary for removing ethylene diamine as the excess of that material is held to a minimum level which will not interfere with the use of ethylene urea condensation products which are to be catalyzed in an acid medium.

(5) When the fluidizing liquids are water miscible, they do not interfere with the use of the ethylene urea in textile treating materials and they have the added advantage of keeping the product liquid at lower temperatures.

In the true solvent operations, considerable saving in solvent cost can be realized by using the solvent solution of ethylene urea from one batch as a part of the solvent for the next. It has been found preferable to use about 50% fresh solvent for each batch to keep the freezing point of the final product at a level low enough to permit it to be readily handled in the liquid state.

It will be understood that the water miscible solvents are the preferred fluidizing liquids because they permit operating at a lower temperature, require less stirring and the reaction proceeds more smoothly from a physical standpoint.

Typical examples of my invention using water miscible solvents are as follows:

Example 1

30 pounds urea
35 pounds ethylene diamine (86%)
25 pounds ethylene glycol (boiling point 197° C.)

These were heated togethher for about two hours in a 20-gallon, stainless steel, reaction kettle equipped with a stirrer, reflux condensers and a thermometer. Ammonia was evolved, and the reflux temperature rose to 130°–315° C. but would rise no higher. At this point, the reaction mixture was an easily stirrable slurry of white, insoluble material. Distillate was removed until the temperature of the reaction mixture rose to 210°–215° C. (Approximately 2 liters of distillate was collected.) At this point, the reaction mixture was a clear solution which deposited water soluble crystals of ethylene urea on cooling. The precipitated ethylene urea at room temperature was equal to an 87% yield.

To form the dimethylol ethylene urea, 81 pounds of 37% formaldehyde and enough sodium hydroxide to raise the pH to 10 were added to the above reaction mixture. The temperature rose to about 65° C. and all the solid ethylene urea dissolved to give a clear, slightly yellow liquid product. This product was neutralized to pH 7 with hydrochloric acid. The final product was a water-ethylene glycol solution of dimethylol ethylene urea.

Example 2

The process of Example 1 was repeated using 25 pounds of propylene glycol (boiling point 189° C.) in place of the ethylene glycol. The reaction proceeded in almost exactly the same manner as in Example 1, and a similar yield of ethylene urea was obtained. The final product was a water-propylene glycol solution containing dimethylol ethylene urea suitable for treatment of textile fabrics.

*Examples 3, 4, 5, 6 and 7*

The process of Example 1 was repeated using 25 pounds of diethylene glycol (boiling point 245° C.) in Example 3, dipropylene glycol (boiling point 229° C.) in Example 4, glycerol (boiling point 290° C.) in Example 5, thiodiglycol [S(CH$_2$CH$_2$OH)$_2$] (boiling point 168° C. at reduced pressure, namely, 14 mm.) in Example 6 and the monoethyl ether of diethylene glycol (boiling point 202° C.) in Example 7. In each instance the reaction proceeded as in Example 1 with a satisfactory yield of ethylene urea and the final product was water soluble and suitable for treatment of textile fabrics.

It will be obvious that the amount of inert solvent is not critical so long as there is enough to keep the reaction mixture stirrable at all times and not too much to lower the boiling point of the reaction mixture below the point at which ethylene urea is formed.

*Example 8*

A mixture of 800 pounds of 98% ethylene diamine (12.4 moles), 785 pounds of urea (13.1 moles), 550 pounds of a solution of ethylene urea in ethylene glycol as formed in a previous run in accordance with this example (369 pounds of ethylene urea), and 550 pounds of ethylene glycol were heated together in a stainless steel reaction kettle equipped with a stirrer, thermometer, and reflux condenser connected to a scrubber to remove ammonia as it was formed. Ammonia was evolved and the temperature of the reaction mass rose to 450° F. (232° C.) over a period of 12 hours. Solids formed in the reaction mixture at a temperature of about 320° F. but the fluidity of the mass was not impaired. At the end of the reaction period, the product was a clear, slightly yellow liquid which could be cooled to 200° F. without deposition of solid ethylene urea.

To form the dimethylol ethylene urea, 1350 pounds of the thus formed ethylene urea was reacted with 1804 pounds of 37% formaldehyde at a temperature of 160° F. and a pH of 9–10 for 10 minutes. The product was then cooled and the pH adjusted to 7.0–8.0.

According to the prior art, it would appear that an excess of ethylene diamine would not adversely affect the process of this invention, but it has now been found that ethylene diamine is difficult to remove from the solution and that the ethylene diamine interferes with the subsequent processing of textiles. For that reason, it is important that no more than a very small excess over one mole of ethylene diamine be used for each mole of urea in those instances where the reaction product is to be used for the treatment of textiles. In one instance, a textile fabric treated with an ethylene urea-formaldehyde condensation product in which the ethylene urea was obtained by the reaction of one mole of urea and one mole of ethylene diamine plus a 20% molar excess of ethylene diamine did not show satisfactory wrinkle resistance. (12.7 mole percent ethylene diamine remained after condensation.) Another portion of the same fabric was treated the same way with an identical ethylene urea-formaldehyde condensation product obtained by the reaction of one mole of urea and one mole of ethylene diamine plus only 3% molar excess of ethylene diamine, and that second fabric had entirely satisfactory wrinkle resistance. (2.1 mole percent ethylene diamine remained after condensation.) It appears that unreacted ethylene diamine interferes with catalysis of the condensation product on the fabric.

Suitable water soluble solvents, in addition to those shown in the examples, are the following:

Polyethylene glycols (molecular wt. 200–600)
Molten ethylene urea (melting point 134° C., boiling point 192° C. at 16 mm.)
1,4 butanediol (boiling point 230° C.)
1,3 butanediol (boiling point 204° C.)
Diethylene glycol monobutyl ether (boiling point 231° C.)
Diethylene glycol diethyl ether (boiling point 188° C.)

Typical examples of my invention using water immiscible fluidizing liquids are as follows:

*Example 9*

A mixture of 66 grams of 91% ethylene diamine (1.0 mole), 60 grams of urea (1.0 mole) and 60 grams of n-decanol (B. P. 231° C.) were heated together in a round bottomed flask equipped with a stirrer, thermometer and reflux condenser. Ammonia was evolved and the temperature of the mass rose to 250° C. over a period of four hours. Solids formed in the reaction mixture during the heating cycle but the mass remained easily stirrable throughout the reaction period. At the end of the reaction period the product was a clear, slightly yellow liquid which deposited crystals of ethylene urea on cooling. The product could be recovered from the reaction mixture by extraction with water or by filtration and washing of the filter cake with a hydrocarbon solvent and drying.

*Example 10*

The process of Example 9 was repeated using 60 grams of high boiling paraffin in place of the n-decanol. The reaction proceeded as in Example 9 except that at the end of reaction the product and the paraffin were present as separate layers.

In operating with some of the fluidizing liquids of this invention, a slight discoloration of the product has been noted. This condition has been improved by the use of conditions tending to avoid oxidation. A nitrogen atmosphere is beneficial as is the use of suitable antioxidants.

Thus it will be seen that the present invention makes possible commercial manufacture of ethylene urea from urea and ethylene diamine at atmospheric pressure in high yield by the use of fluidizing liquids having a high boiling point.

I claim:

1. The process for producing ethylene urea which comprises heating about one mole of ethylene diamine with one mole of urea at atmospheric pressure in the presence of an organic water miscible solvent which has a relatively high boiling point of from 189° C. to 290° C. and which is inert to the other ingredients under the reaction conditions.

2. The process as set forth in claim 1 wherein the solvent is ethylene glycol.

3. The process as set forth in claim 1 wherein the solvent is propylene glycol.

4. The process as set forth in claim 1 wherein the solvent is diethylene glycol.

5. The process as set forth in claim 1 wherein the solvent is dipropylene glycol.

6. The process as set forth in claim 1 wherein the solvent is glycerol.

7. The process as set forth in claim 1 wherein the solvent is an ethylene glycol-ethylene urea mixture.

8. The process for producing water-soluble solutions of dimethylol ethylene urea which comprises reacting one mole of ethylene diamine with one mole of urea at atmospheric pressure in the presence of an organic water miscible solvent which has a relatively high boiling point of from about 189° C. to 290° C. and which is inert to the other ingredients under the reaction conditions, and thereafter condensing the reaction product with about two moles of formaldehyde under basic conditions.

9. The process of producing ethylene urea which comprises heating stoichiometric quantities of urea and ethylene diamine in the presence of an amount of ethylene glycol substantially equal to the amount of ethylene diamine, whereby the reflux temperature will be about 130°–135° C., continuing said heat while removing distillate until the temperature of the reaction material rises to about 210°–215° C. and cooling the thus formed product to precipitate ethylene urea.

10. The process for producing ethylene urea which comprises heating at a relatively high temperature below the decomposition point of ethylene urea about one mole of ethylene diamine with one mole of urea at atmospheric pressure in the presence of an organic fluidizing liquid which has a relatively high boiling point of at least 189° C. and which is inert to the other ingredients under the reaction conditions.

11. The process as set forth in claim 1 wherein said heating is at a relatively high temperature of at least about 210° C. towards the end of the reaction and the boiling point of the fluidizing liquid plus reaction components towards the end of the reaction is at least as high as said relatively high temperature.

12. The process for producing ethylene urea which comprises heating at a relatively high temperature below the decomposition point of ethylene urea about one mole of ethylene diamine with one mole of urea at atmospheric pressure in the presence of an organic fluidizing liquid which has a relatively high boiling point of at least about 189° C. and which is inert to the other ingredients under the reaction conditions, said heating being at a relatively high temperature of at least about 210° C. towards the end of the reaction and the boiling point of the fluidizing liquid plus reaction components towards the end of the reaction being at least as high as said relatively high temperature.

13. The process for producing ethylene urea which comprises heating at a relatively high temperature below the decomposition point of ethylene urea about one mole of ethylene diamine with one mole of urea at atmospheric pressure in the presence of an organic water miscible solvent which has a relatively high boiling point of at least about 189° C. and which is inert to the other ingredients under the reaction conditions.

14. The process for producing water-soluble solutions of dimethylol ethylene urea which comprises heating at a relatively high temperature below the decomposition point of ethylene urea one mole of ethylene diamine with one mole of urea at atmospheric pressure in the presence of an organic water miscible solvent which has a relatively high boiling point of at least about 189° C. and which is inert to the other ingredients under the reaction conditions, and thereafter condensing the reaction product with about two moles of formaldehyde under basic conditions.

15. The process of producing ethylene urea which comprises heating at a relatively high temperature below the decomposition point of ethylene urea about one mole of ethylene diamine with one mole of urea at atmospheric pressure in the presence of a water immiscible fluidizing organic liquid having a boiling point of at least 231° C. and which is inert to the other ingredients under the reaction conditions.

16. The process as set forth in claim 15 wherein the fluidizing liquid is molten paraffin wax.

17. The process as set forth in claim 15 wherein the fluidizing liquid is n-decanol.

References Cited in the file of this patent

UNITED STATES PATENTS

| | | |
|---|---|---|
| 2,463,311 | Larson et al. | Feb. 17, 1948 |
| 2,497,308 | Larson | Feb. 14, 1950 |
| 2,497,309 | Larson | Feb. 14, 1950 |
| 2,504,431 | Loder | Apr. 18, 1950 |
| 2,517,750 | Wilson | Aug. 8, 1950 |

OTHER REFERENCES

Schweitzer, C. J., Org. Chem., vol. 15, page 472 (1950). (Copy in Scientific Library.)